United States Patent
Li et al.

(10) Patent No.: US 11,607,730 B2
(45) Date of Patent: Mar. 21, 2023

(54) METHOD FOR FORMING A MULTI-MATERIAL PART BY SELECTIVE LASER MELTING

(71) Applicant: Xi'an Space Engine Company Limited, Shaanxi (CN)

(72) Inventors: Hulin Li, Shaanxi (CN); Huanqing Yang, Shaanxi (CN); Jing Bai, Shaanxi (CN); Lin Wang, Shaanxi (CN); Dongjian Peng, Shaanxi (CN); Yun Wang, Shaanxi (CN)

(73) Assignee: Xi'an Space Engine Company Limited, Xi'an (CN)

( * ) Notice: Subject to any disclaimer, the term of this patent is extended or adjusted under 35 U.S.C. 154(b) by 147 days.

(21) Appl. No.: 17/117,077

(22) Filed: Dec. 9, 2020

(65) Prior Publication Data

US 2021/0170495 A1    Jun. 10, 2021

(30) Foreign Application Priority Data

Dec. 10, 2019  (CN) .......................... 201911261821.X

(51) Int. Cl.
*B33Y 10/00*   (2015.01)
*B23K 26/342*  (2014.01)
(Continued)

(52) U.S. Cl.
CPC ................ *B22F 7/06* (2013.01); *B22F 10/20* (2021.01); *B22F 10/28* (2021.01); *B22F 10/43* (2021.01);
(Continued)

(58) Field of Classification Search
CPC .......... B22F 10/85; B22F 10/28; B22F 10/40; B22F 10/64; B22F 10/20; B22F 10/66;
(Continued)

(56) References Cited

U.S. PATENT DOCUMENTS 8,469,691 B2 *  6/2013  Amaya ................... B29C 64/40
                                                            425/375
2011/0256252 A1 * 10/2011  Amaya ................... B29C 64/40
                                                             425/78

(Continued)

FOREIGN PATENT DOCUMENTS

| CN | 106001571 B | 3/2017 |
| CN | 106735208 A | 5/2017 |
| WO | 2016026415 A1 | 2/2016 |

*Primary Examiner* — Lawrence Averick

(57) ABSTRACT

A method for forming a multi-material part by selective laser melting includes the following steps. Modeling is performed by regularly distributing and arraying a combination of materials that meets forming requirements such that a part model is designed. The designed part model is subjected to a dimension compensation, a shape compensation, a chamfering setting, a margin design and a design of a process support to obtain a process model. The obtained process model is sliced into a series of layers. Type, distribution and boundary information of materials in each layer are collected to generate a control file. All materials required for part forming are loaded into an additive manufacturing equipment. After a state of the additive manufacturing equipment meets forming requirements, a part is formed under the control of the generated control file. Post-processing is performed after the part is formed.

9 Claims, 1 Drawing Sheet

```
Design a part model by regularly distributing and arraying
a combination of materials that meets forming requirements   — S1

Perform a dimension compensation, a shape compensation,
a chamfering setting, a margin design and a design of a
process support on the designed part model to to obtain a    — S2
                    process model Slice the obtained process model into a series of layers
according to a predetermined layer thickness; and then
collect type, distribution and boundary information of       — S3
   materials in each layer to generate a control file Load all materials required for part forming into an
additive manufacturing equipment; set forming parameters
of the additive manufacturing equipment; and after a state   — S4
  of the forming equipment meets forming requirements,
form a part under the control of the generated control file After the part is formed, separate the formed part from the
forming equipment and post-process powder of respective      — S5
materials remained in the additive manufacturing equipment
```

(51) Int. Cl.
*B22F 7/06* (2006.01)
*B33Y 50/02* (2015.01)
*B22F 10/85* (2021.01)
*B22F 10/28* (2021.01)
*B22F 10/20* (2021.01)
*B22F 10/73* (2021.01)
*B22F 10/43* (2021.01)
*B22F 10/80* (2021.01)
*B22F 12/53* (2021.01)
*B22F 12/55* (2021.01)
*B22F 10/64* (2021.01)
*B22F 10/66* (2021.01)

(52) U.S. Cl.
CPC .............. *B22F 10/73* (2021.01); *B22F 10/80* (2021.01); *B22F 10/85* (2021.01); *B33Y 10/00* (2014.12); *B33Y 50/02* (2014.12); *B22F 10/64* (2021.01); *B22F 10/66* (2021.01); *B22F 12/53* (2021.01); *B22F 12/55* (2021.01); *B23K 26/342* (2015.10)

(58) Field of Classification Search
CPC .......... B22F 12/53; B22F 12/55; B22F 10/43; B22F 10/73; B22F 10/80; B22F 7/06; B22F 3/24; B22F 7/02; B22F 2003/248; B22F 10/00; B33Y 10/00; B33Y 50/02; B33Y 30/00; B33Y 50/00; B23K 26/342; Y02P 10/25
See application file for complete search history.

(56) References Cited

U.S. PATENT DOCUMENTS

| | | | |
|---|---|---|---|
| 2015/0273622 A1* | 10/2015 | Manabe | B23K 15/0086 |
| | | | 219/76.1 |
| 2018/0311769 A1* | 11/2018 | TenHouten | B22F 10/20 |
| 2020/0061871 A1* | 2/2020 | Gerade | B29C 64/245 |
| 2020/0376552 A1* | 12/2020 | Fukuda | G06F 30/00 |
| 2021/0252780 A1* | 8/2021 | TenHouten | B22F 7/06 |

* cited by examiner

S1 — Design a part model by regularly distributing and arraying a combination of materials that meets forming requirements

S2 — Perform a dimension compensation, a shape compensation, a chamfering setting, a margin design and a design of a process support on the designed part model to to obtain a process model

S3 — Slice the obtained process model into a series of layers according to a predetermined layer thickness; and then collect type, distribution and boundary information of materials in each layer to generate a control file

S4 — Load all materials required for part forming into an additive manufacturing equipment; set forming parameters of the additive manufacturing equipment; and after a state of the forming equipment meets forming requirements, form a part under the control of the generated control file

S5 — After the part is formed, separate the formed part from the forming equipment and post-process powder of respective materials remained in the additive manufacturing equipment

METHOD FOR FORMING A MULTI-MATERIAL PART BY SELECTIVE LASER MELTING

CROSS-REFERENCE TO RELATED APPLICATIONS

This application claims the benefit of priority from Chinese Patent Application No. 201911261821.X, filed on Dec. 10, 2019. The content of the aforementioned application, including any intervening amendments thereto, is incorporated herein by reference in its entirety.

TECHNICAL FIELD

The present application relates to part forming processes, and more particularly to a method for forming a multi-material part by selective laser melting.

BACKGROUND

Multi-material parts, also called heterogeneous material parts, are a kind of functional parts prepared by regularly distributing various materials, and their materials, shape and performance can controllably vary. In modern industry, products are required to have better functionalities and performance, and parts manufactured by a single material are hard to meet the demand, so methods for forming the multi-material parts become an area of intensive research. The existing methods for forming the multi-material parts mainly include a centrifugal foundry method, a physico-chemical vapor deposition method, a self-propagating high-temperature synthesis, a powder metallurgy, a plasma spraying and a laser cladding method. However, these methods generally involve problems of few types of available materials, low bonding strength between materials, uncontrollable material distribution, sample shapes of parts and inability to guarantee the dimensional accuracy of the parts.

SUMMARY

In order to overcome the mentioned problems in the prior art, the present application provides a method for forming a multi-material part by selective laser melting, which can form the multi-material part with high quality and high precision.

The present application adopts the following technical solutions.

Provided is a method for forming a multi-material part by selective laser melting, comprising:

1) modeling by regularly distributing and arraying a combination of materials that meets forming requirements to complete a design of a part model;

2) subjecting the designed part model to a dimension compensation, a shape compensation, a chamfering setting, a margin design and a design of a process support, thereby obtaining a process model;

3) slicing the obtained process model into a series of layers according to a predetermined layer thickness; and then collecting type, distribution and boundary information of materials in each layer, thereby generating a control file to guide a forming process of additive manufacturing;

4) loading all materials required for part forming into an additive manufacturing equipment; setting forming parameters of the additive manufacturing equipment; and after a state of the additive manufacturing equipment meets forming requirements, forming a part under the control of the generated control file; and 5) after the part is formed, separating the formed part from the additive manufacturing equipment and post-processing powder of respective materials remained in the additive manufacturing equipment.

In some embodiments, in step 1), the combination of materials comprises a combination of metal and non-metal materials to which selective laser melting is applicable.

In some embodiments, respective materials in the combination of materials are compatible with each other.

In some embodiments, if respective materials in the combination of materials are not compatible with each other, a new material is added such that the respective materials in the combination of materials are compatible with each other.

In some embodiments, in step 2), the process support is formed from a material that is more brittle than and is compatible with a material of a portion of the part corresponding to the process support; and the process support is configured to position and support the part during the forming process, and is able to separate from the part.

In some embodiments, in step 4), all the materials required for part forming that are powdery are separately sprayed to a forming chamber of the additive manufacturing equipment through a corresponding nozzle.

In some embodiments, in step 4), during the forming process of the part, a non-part forming area in the forming chamber is filled with a material which is different from the materials required for part forming, and has a melting point higher than a set temperature and a laser utilization rate lower than a set laser utilization rate.

In some embodiments, in step 5), after the part is formed, the powder of respective materials remained in the additive manufacturing equipment is separated by centrifugation according to its density, so that separated impurity-free powder of respective materials is obtained, then sieved through a sieve according to its particle size and then recycled for use.

In some embodiments, in step 5), the formed part experiences heat treatment to relieve partial thermal stress of the part; and during the forming process, the part is formed on a substrate, the substrate is removed by wire-electrode cutting, and the process support is manually removed.

Compared to the prior art, the present application has the following advantages.

1) In the present application, the separate nozzle is adapted to spray the corresponding powder, and heterogeneous filling materials are used, and the process support uses heterogeneous materials and powder of respective materials is sieved. In this way, it is possible to form multi-material parts by selective laser melting, which prevents power of different materials from nixing, thereby forming the multi-material part with high quality and high precision.

2) Materials required for part forming are processed using the laser forming method of the present application. After the materials undergo a physical change process of melting and solidification, the part is formed. Therefore, all materials that are suitable for laser forming can be used for forming the multi-material part, thereby broadening the range of available materials for forming the multi-material part.

3) Since the laser forming is adopted in the present application, the forming materials all undergo a metallurgical process of melting and solidification in the forming process, which ensures the metallurgical bonding within the same materials or between different materials to increase their bonding strength, thereby improving the quality of the formed part.

4) Forming materials used in the application are powdery, and each forming material is spayed by a nozzle to complete the feeding of respective forming materials. Due to the use of the nozzle that has high precision, the material distribution in each cross section of the formed part is ensured that it has control ability of the precise, so that, the material distribution in the whole part is controllable, thereby improving the accuracy of the formed part. At the same time, the use of the high-precision nozzle can prevent various powdery materials from doping with each other in the forming process, greatly enhancing the operability of the subsequent recovery and reuse of remaining powder after the forming is completed.

5) After the part is formed, the powder of respective materials remained in the additive manufacturing equipment is separated by centrifugation according to its density, so that separated impurity-free powder of respective materials is obtained and then sieved through a sieve according to its particle size and then recycled for use to improve the utilization rate of respective powdery materials.

6) As used herein, a non-part forming area in the forming chamber is filled with heterogeneous materials with the high melting point and low laser utilization rate, which can not only ensure the stability of the powder laying process, but also maintain the thermal environment around the part at a relatively balanced level, thereby improving the quality of the formed part.

7) In the present application, the process support is formed from a material that is more brittle than that of a portion of the part supported by the process support, so that the process support and the part have different strengths, thereby facilitating the removal of the process support in the post-processing.

8) The forming method used herein aims to form the part in a cumulative manner, i.e., from points to lines, and from lines to faces, and from faces to bodies, which is similar to the process of the additive manufacturing, and the forming method of the present application is still suitable for parts with complex shapes.

BRIEF DESCRIPTION OF THE DRAWINGS

FIGURE is a process chart showing a method for a multi-material part by selective laser melting according the present disclosure.

DETAILED DESCRIPTION OF EMBODIMENTS

The drawing shows a method for forming a multi-material part by selective laser melting, which includes the following steps.

S1 Design of a part model

Modeling is performed, during which a combination of materials that meets forming requirements is arrayed according to an appropriate distribution rule to allow a part to be designed to have respective functions, thereby completing a design of a part model. Where, some related factors, such as strength, weight and size, are considered in the design criteria for the purpose of optimization. The appropriate distribution rule refers that materials required for forming respective portions of the part are chosen according to the functions that respective portions of the part need to realize, and the location and environment of respective portions of the part during the use. For example, copper or copper alloy materials are distributed at a portion of the part where excellent thermal conductivity is required; and high temperature alloy or other high-temperature resistant materials are distributed at a portion of the part that needs to withstand a high temperature environment during the use.

Specifically, during modeling, a modeling software is used. According to required functionalities of a part to be designed, a combination of materials that meets requirements is arrayed in the modeling software according to an appropriate distribution rule. In addition, a design criterion used herein takes account of some related factors, such as strength, weight and size, to perform an overall optimization, thereby obtaining a part model containing information of material distribution, structural feature, reference position and dimensional data. The combination of materials includes metal and non-metal materials to which selective laser melting is applicable. In some embodiments, respective materials in the combination of materials are compatible with each other. In some embodiments, if respective materials in the combination of materials are not compatible with each other, a new material is added such that the respective materials in the combination of materials are compatible with each other.

S2 Obtaining of a process model

According to the shape, size and stress variation law of respective materials during additive manufacturing and considering that there may be a material removal process in the post-processing, the part model obtained in step 1) is subjected to a dimension compensation, a shape compensation, a chamfering setting, a margin design and a design of a process support to obtain a process model containing information of the part model and the above operations.

Specifically, the process support required in the forming process is formed from a material that is more brittle than and is compatible with a material of a portion of the part corresponding to the process support. The process support is configured to position and support the part during the forming process and is able to separate from the part.

Specifically, the process support is provided around a periphery of the part. One end of the process support abuts against the part, and the other end of the process support abuts against a substrate or other portions of the part, so as to position and support the part. The process support may take the shape of rod, mesh or block. In an embodiment, the process support includes a positioning support and an anti-deformation support, where the positioning support is used to position the part, and the anti-deformation support is used to prevent the part from deforming.

S3 Creation of a control file

The process model obtained in step 2) is imported into a slicer software in which the process model is sliced into layers according to a predetermined layer thickness. Then, the type, distribution and boundary information of materials in each layer are collected to create a control file for guiding the forming process during additive manufacturing. The control file specifically realizes the control to the feeding of respective powdery materials during the powder laying process, the partition of the scanning area during the laser scanning process and the working state of a circulating purification system. The setting of the layer thickness is a compromise between efficiency and accuracy. Specifically, the process model is sliced with a layer thickness larger than the predetermined layer thickness in the case of focusing on efficiency rather than accuracy; and the process model is sliced with a layer thickness smaller than the predetermined layer thickness in the case of focusing on accuracy rather than efficiency.

S4 Additive manufacturing

The control file generated in step 3) is input into an additive manufacturing equipment. All materials required for part forming are loaded into a powder supply system of the additive manufacturing equipment. Forming parameters of the additive manufacturing equipment, such as laser power, scanning interval, scanning speed and scanning strategy, are set to meet the forming demands of the respective materials. After a state of the additive manufacturing equipment meets forming requirements, the part is formed under the control of the generated control file. The state of the additive manufacturing equipment meets the forming requirements when indicators such as an oxygen content, pressure, temperature and an amount of powder in the forming chamber, that are closely related to the smooth progress of the forming process, should meet the forming requirements.

Specifically, the additive manufacturing equipment used herein is a forming equipment which can form the multi-material part by selective laser melting.

All powdery materials required in the forming process of the part are separately sprayed to a forming chamber of the additive manufacturing equipment through a corresponding nozzle in a nozzle dot matrix of the additive manufacturing equipment. Each of the nozzles is communicated with a corresponding powder storage device of the additive manufacturing equipment through a flexible pipe. The powdery materials are separately stored in a powder storage device.

A non-part forming area in the forming chamber is filled with a material which is different from the materials required for part forming, and has a melting point higher than a set temperature and a laser utilization rate lower than a set laser utilization rate. Specifically, a material in the forming materials that has the highest melting point can melt under the set temperature. The set laser utilization rate is a laser utilization rate of a material in the forming materials that has the lowest laser utilization rate. The process support required in the forming process is formed from a material that is more brittle than and is compatible with materials of a portion of the part corresponding to the process support. And the process support can be separated from the part.

S5 Post-processing

The part formed in step 4) experiences heat treatment to relieve partial thermal stress of the part. During the forming process, the part is formed on a substrate, and the substrate is removed by wire-electrode cutting, and the process support is manually removed, lithe formed part can satisfy the accuracy requirement, there is no need to machine the part; and if the formed part does not need the addition of other features subsequently, there is no need to reform the part. On the contrary, the part needs to be machined or reformed to allow the part to meet the accuracy requirements, or needs the addition of other features. After the part is formed, powder of respective materials remained in the additive manufacturing equipment is separated by centrifugation according to its density, so that separated impurity-free powder of respective materials is obtained, then sieved through a sieve according to its particle size and recycled for use.

Machining, reforming and other steps are not mandatory during the forming of the multi-material parts.

Embodiment 1

A part is formed from copper and stainless steel through the following steps.

S1 Design of a part model

Modeling is performed, during which copper and stainless steel materials are combined and arrayed in a modeling software according to functionalities of a part required to be realized. In addition, a design criterion used herein takes account of some related factors, such as strength, weight and size, to perform an overall optimization, thereby obtaining a part model containing material distribution, structural feature, reference position and dimensional data.

S2 Obtaining of a process model

The part model designed in step 1) is subjected to a dimension compensation, a shape compensation and a chamfering setting according to the shape, size and stress variation law of the copper and stainless steel materials during the forming process by selective laser melting. A margin design is applied to a portion of the part that needs the machining after the part is formed. Finally, the positioning support and the anti-deformation support are applied to the part as needed, thereby obtaining a process model containing information of the part model and the above operations.

S3 Creation of a control file

The process model obtained in step 2) is imported into a slicer software in which the process model is sliced into layers according to a predetermined layer thickness. Then, the distribution and boundary information of the copper and stainless steel materials in each layer are collected to create a control file to guide the selective laser melting forming process, such as the spraying of respective powdery materials during the powder laying process, the partition of the scanning area during the laser scanning process and the working state of the circulating purification system.

S4 Additive manufacturing

The control file generated in step 3) is input into the additive manufacturing equipment. The powder supply system of the additive manufacturing equipment is filled with copper powder and stainless steel powder required for part forming, and ceramic powder for fabricating the positioning support and the anti-deformation support; and tungsten powder for filling a non-part forming area in the forming chamber. The corresponding forming parameters of the additive manufacturing equipment, such as laser power, scanning interval, scanning speed and scanning strategy are set for the forming of the copper powder, stainless steel powder and ceramic powder. After the state of the additive manufacturing equipment meets the forming requirements, the part is formed under the control of the generated control file.

S5 Post-processing

The part formed in step 4) experiences heat treatment to relieve partial thermal stress of the part; then the substrate is removed by wire-electrode cutting, and the positioning support and anti-deformation support are manually removed. Finally, the part is subjected to operations such as machining and reforming. After the part is formed, powder of respective materials remained in the additive manufacturing equipment is separated by centrifugation according to its density, so that separated impurity-free powder of respective materials is obtained, then sieved through a sieve according to its particle size and recycled for use.

Embodiment 2

A gradient part is formed from $Ti_3Al$ and TC11 titanium alloy through the following steps.

S1 Design of a part model

Modeling is performed, during which, $Ti_3Al$ and TC11 titanium alloy are combined and arrayed in a modeling software according to the functionalities of a part required to be realized. In addition, a design criterion used herein takes account of some related factors, such as strength, weight and size, to perform an overall optimization, thereby obtaining a part model containing material distribution, structural feature, reference position and dimensional data.

S2 Obtaining of a process model

The part model designed in step 1) is subjected to a dimension compensation, a shape compensation and a chamfering setting according to the shape, size and stress variation law of the $Ti_3Al$ and TC11 titanium alloy during the forming process by selective laser melting. A margin design is applied to a portion of the part that needs the machining after the part is formed. Finally, the positioning support and the anti-deformation support are applied to the part as needed, thereby obtaining a process model containing information of the part model and the above operations.

S3 Creation of a control file The process model obtained in step 2) is imported into a slicer software in which the process model sliced into layers according to a predetermined layer thickness. Then, the distribution and boundary information of $Ti_3Al$ and TC11 titanium ahoy in each layer are collected to create a control file to guide the selective laser melting forming process, such as the spraying of $Ti_3Al$ and TC11 titanium alloy powder during the powder laying process, the partition of the scanning area during the laser scanning process and the working state of the circulating purification system.

S4 Additive manufacturing

The control file generated in step 3) is input into the additive manufacturing equipment. The powder supply system of the additive manufacturing equipment is filled with $Ti_3Al$ powder and TC11 titanium alloy powder required for part forming, and stainless steel powder for fabricating the positioning support and the anti-deformation support; and tungsten powder for filling a non-part forming area in the forming chamber. The corresponding forming parameters of the additive manufacturing equipment, such as laser power, scanning interval, scanning speed and scanning strategy are set for the forming of $Ti_3Al$ powder, TC11 titanium alloy powder and stainless steel powder. After the state of the additive manufacturing equipment meets the forming requirements, the part is formed under the control of the generated control file.

S5 Post-processing

The part formed in step 4) experiences heat treatment to relieve partial thermal stress of the part; then the substrate is removed by wire-electrode cutting, and the positioning support and anti-deformation support are manually removed. Finally, the part is subjected to operations such as machining and reforming. After the part is formed, powder of respective materials remained in the additive manufacturing equipment is separated by centrifugation according to its density, so that separated impurity-free powder of respective materials is obtained, then sieved through a sieve according to its particle size and recycled for use.

Some techniques known to those skilled in the art are not described in detail in the specification of the present application. It should be noted that any modification, replacement and combination made by those skilled in the art without departing from the spirit of the present application should fall within the scope as defined by the appended claims.

What is claimed is:

1. A method for forming a multi-material part by selective laser melting, comprising:
   1) modeling by regularly distributing and arraying a combination of materials that meets forming requirements to complete a design of a part model;
   2) subjecting the designed part model to a dimension compensation, a shape compensation, a chamfering setting, a margin design and a design of a process support, thereby obtaining a process model;
   3) slicing the obtained process model into a series of layers according to a predetermined layer thickness; and then collecting type, distribution and boundary information of materials in each layer, thereby generating a control file to guide a forming process of additive manufacturing;
   4) loading all materials required for part forming into an additive manufacturing equipment; setting forming parameters of the additive manufacturing equipment; and after a state of the additive manufacturing equipment meets forming requirements, forming a part under the control of the generated control file; and
   5) after the part is formed, separating the formed part from the additive manufacturing equipment and post-processing powder of respective materials remained in the additive manufacturing equipment;
   wherein in step 4), during the forming process of the part, a non-part forming area in a forming chamber is filled with a material which is different from the materials required for part forming, and has a melting point higher than a set temperature and a laser utilization rate lower than a set laser utilization rate.

2. The method of claim 1, wherein in step 1), the combination of materials comprises a combination of metal and non-metal materials to which selective laser melting is applicable.

3. The method of claim 2, wherein respective materials in the combination of materials are compatible with each other.

4. The method of claim 2, wherein if respective materials in the combination of materials are not compatible with each other, a new material is added such that the respective materials in the combination of materials are compatible with each other.

5. The method of claim 1, wherein in step 2), the process support is formed from a material that is more brittle than and is compatible with a material of a portion of the part corresponding to the process support; and the process support is configured to position and support the part during the forming process, and is able to separate from the part.

6. The method of claim 5, wherein in step 5), the formed part experiences heat treatment to relieve partial thermal stress of the part; and during the forming process, the part is formed on a substrate, the substrate is removed by wire-electrode cutting, and the process support is manually removed.

7. The method of claim 1, wherein in step 4), all the materials required for part forming that are powdery are separately sprayed to the forming chamber of the additive manufacturing equipment through a corresponding nozzle.

8. A method for forming a multi-material part by selective laser melting, comprising:
   1) modeling by regularly distributing and arraying a combination of materials that meets forming requirements to complete a design of a part model;
   2) subjecting the designed part model to a dimension compensation, a shape compensation, a chamfering setting, a margin design and a design of a process support, thereby obtaining a process model;
   3) slicing the obtained process model into a series of layers according to a predetermined layer thickness;

and then collecting type, distribution and boundary information of materials in each layer, thereby generating a control file to guide a forming process of additive manufacturing;

4) loading all materials required for part forming into an additive manufacturing equipment setting forming parameters of the additive manufacturing equipment and after a state of the additive manufacturing equipment meets forming requirements, forming a part under the control of the generated control file; and 5) after the part is formed, separating the formed part from the additive manufacturing equipment and post-processing powder of respective materials remained in the additive manufacturing equipment;

wherein in step 5), after the part is formed, the powder of respective materials remained in the additive manufacturing equipment is separated by centrifugation according to its density, so that separated impurity-free powder of respective materials is obtained, then sieved through a sieve according to its particle size and then recycled for use.

9. The method of claim 8, wherein in step 5), the formed part experiences heat treatment to relieve partial thermal stress of the part; and during the forming process, the part is formed on a substrate, the substrate is removed by wire-electrode cutting, and the process support is manually removed.

* * * * *